June 9, 1931. A. C. HAYDEN 1,809,338
PANORAMIC CAMERA ATTACHMENT
Filed March 14, 1927 2 Sheets-Sheet 1
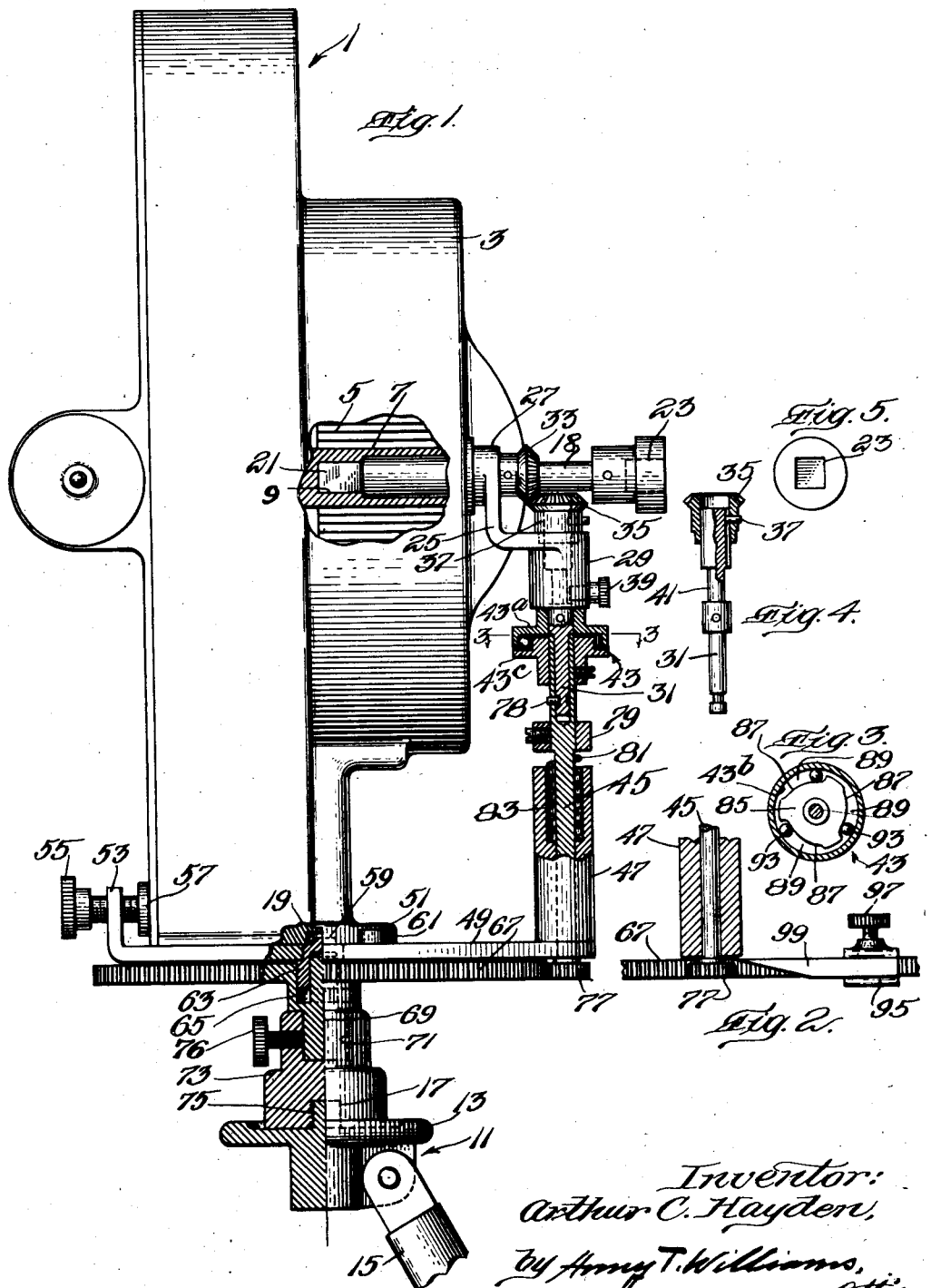
Inventor:
Arthur C. Hayden,
by Amy T. Williams,
Atty.

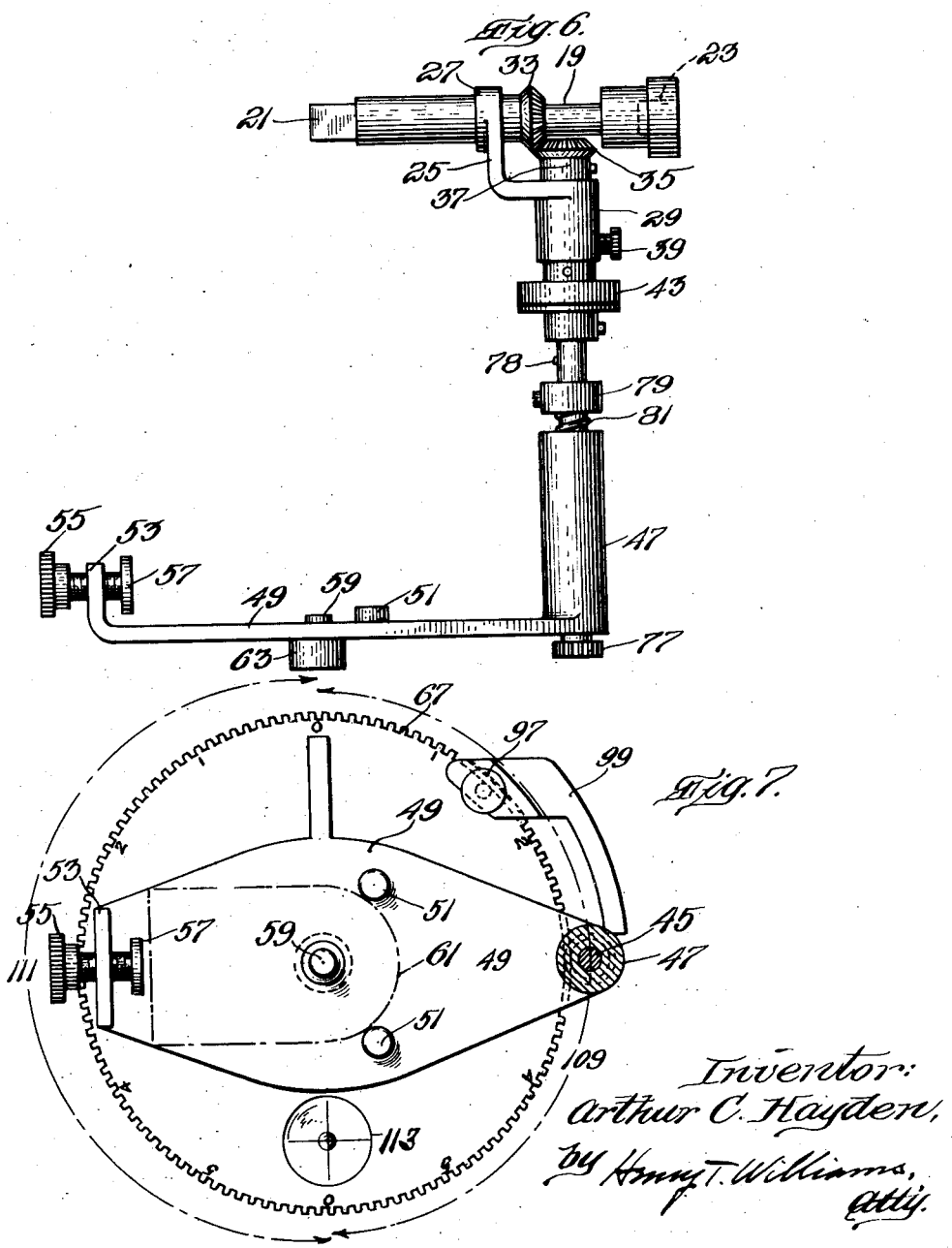

Patented June 9, 1931

1,809,338

UNITED STATES PATENT OFFICE

ARTHUR C. HAYDEN, OF BROCKTON, MASSACHUSETTS

PANORAMIC CAMERA ATTACHMENT

Application filed March 14, 1927. Serial No. 175,116.

The invention to be hereinafter described relates to an attachment for application to an ordinary panoramic motion picture camera and for cooperation with the camera and its support automatically to impart a slow uniform rotative movement to the camera in taking panoramic motion pictures.

The usual motion picture camera has a main shaft encircled by convolutions of a powerful spring, one end of which is attached to the shaft and the opposite end of which is attached to the camera casing. This spring rotates the shaft and through suitable gearing rotates the film reels to feed the film in taking motion pictures. This main shaft has a square socket for receiving a key for winding the spring from time to time.

The attachment embodying the present invention takes its power from the same powerful spring which operates to feed the film in the camera, and may be readily applied to the camera without alteration thereof.

The character of the invention will be best understood by reference to the following description of one good form thereof shown in the accompanying drawings, wherein:

Fig. 1 is a view partly in elevation and partly in section of the camera, a portion of the tripod and the attachment for connecting the camera to the tripod;

Fig. 2 is a sectional detail showing the cam finger which is engaged by the pinion in automatically stopping the rotative movement of the camera;
Fig. 3 is a horizontal section taken on line 3—3 of Fig. 1;

Fig. 4 is a view partly in elevation and partly in section of the upper vertical shaft and the bevel gear thereon;
Fig. 5 is an end view of the supplemental shaft showing the key receiving socket therein;

Fig. 6 is a side elevation of the attachment for the camera; and Fig. 7 is a plan of the plate of the attachment, the spur gear beneath it, and the automatic stop device.

Referring to the drawings, 1 (Fig. 1) designates the ordinary motion picture camera, the casing of which has a cylindrical portion 3 containing the powerful coil spring 5, the convolutions of which surround the main shaft 7, one end of the spring being attached to the casing and the other end thereof being attached to the shaft. The spring furnishes the power for rotating the shaft and through suitable well known gearing rotates the take-up reel on which the film is wound in taking motion pictures. The main shaft is hollow and has a square socket 9 for receiving the usual key for rotating the shaft and winding the spring.

The camera may be provided with a suitable support, in the present instance, in the form of a tripod 11 (Fig. 1) having a head 13 and three legs 15 pivotally connected to the head, projecting up from the head 13 is a threaded stud 17 adapted to be screwed into a threaded socket 19 in the bottom of the camera when it is desired to take motion pictures which are not panoramic pictures.

The attachment of the present invention for application to the camera and tripod, when it is desired to take panoramic motion pictures, comprises a supplemental shaft 21 having a portion for insertion into the hollow main shaft, referred to, and a square end 21 adapted to be fitted into the square socket 9 of the main shaft. The outer end of the supplemental shaft is provided with a square socket 23 (Fig. 5) of the same size as the socket 9, and adapted to receive the key which may operate through the supplemental shaft and the main shaft to wind the spring without removing the attachment from the camera.

A hanger 25 is carried by the supplemental shaft and has a sleeve 27 encircling said shaft. Depending from the sleeve is a bearing 29 in which is mounted an upper vertical shaft 31 (Figs. 1 and 4). A bevel gear 33, fast on the supplemental shaft, meshes with a bevel gear 35 on the upper shaft 31. Said gear 35 is connected to the shaft 31 by a spline 37 so that said shaft may slide relatively to the bevel gear 35 and the bearing 29, for a purpose to be described. To prevent the upper shaft 31 from dropping out of the bearing, a stop screw 39 is threaded into the bearing 29 and enters a circumferential groove 41 in the upper shaft, the construction being such that said shaft may slide downward until limited by engagement of the upper end of the groove with the stop screw.

The upper shaft 31 may be connected by a clutch 43 to be described, with a lower vertical shaft 45 mounted in a long bearing 47 secured to and rising from a plate or holder 49 which is provided with means for connecting the plate with the bottom of the camera. This means, in the present instance, comprises a pair of lugs 51 (Fig. 7) projecting up from the plate, a flange 53 (Fig. 1) projecting up from an end of the plate and a hand screw 55 threaded into a hole in the flange and having a swivelled button 57 for engagement with the camera. A short stud 59 projects up from the plate and is adapted to enter loosely into the threaded hole 19 referred to in the bottom of the camera. The construction is such that the plate 49 may be presented to the camera with the stud 59 in the hole 19 and the lugs 51 at the opposite sides of the usual rounded extension 61 at the bottom of the camera. Then the hand screw 55 may be adjusted so that the button 57 will press against the camera and thrust the rounded projection 61 between and firmly against the lugs 51 on the plate 49. Thus the bottom of the camera is clamped and secured to the plate.

Projecting down from the plate is a sleeve-shaped swivel stud 63 (Fig. 1) adapted to enter into an annular socket 65 in a large spur gear 67. Projecting down from the gear is a stud 69 in a socket 71 in a base 73 having a threaded hole 75 in the bottom thereof adapted to be screwed onto the stud 17, referred to, of the tripod head. The gear stud 69 may be secured in the base socket 71 by the set screw 76. The construction is such that the base 73 may be secured to the tripod head, the gear 67 may be secured to the base, and the camera and plate may have rotative movement on the fixed gear.

Referring again to the vertical shaft 45, the lower end thereof projects down beyond the long bearing 47, and has a pinion 77 fast thereon meshing with the gear 67. At the upper end of the long bearing 47 is a collar 79 and a coil spring 81 encircles the shaft and is confined between said collar and the lower end of a counterbore 83 in the bearing. The construction is such that this spring normally holds the upper shaft 31 and the lower shaft 45 upward until limited by engagement of the pinion 77 with the lower face of the plate 49.

The upper and lower shafts may be connected for united vertical movement by a screw 78 threaded into the lower shaft and entering a circumferential groove in a reduced end of the upper shaft entering a socket in the lower shaft.

In applying the attachment to the camera, the supplemental shaft is introduced into the main shaft, and then the plate 49 and the upper and lower shafts are pulled downward somewhat as permitted by the spline 37 connecting the upper shaft 31 with the bevel gear 35, in order that the plate flange 53 and lugs 51 may clear the base of the camera and allow the supplemental shaft to be thrust on into the main shaft with its square end 21 in the socket 9. Then the plate 49 may be moved upward so that its stud 59 enters into the threaded hole 19 in the base of the camera, the lugs 51 stand at opposite sides of the rounded projection 61 of the camera base, and the flange 53 is in opposition to the back of the camera. Then the hand screw 55 is adjusted to clamp the camera to the plate.

The clutch 43, referred to, is so constructed that it will impart rotation from the upper shaft 31 to the lower shaft 45 when rotated in one direction, but will not impart rotation from the upper shaft to the lower shaft when rotated in the opposite direction. To this end the clutch comprises a disk 43a which is fast on the upper shaft and has a circular recess 43b closed by a cover plate 43c. A block 85 is fast on the lower shaft 45 and is received by the circular recess of the disk. The block has edges 87 which combine with the circular wall of the recess to provide wedge-shaped spaces 89 in which are balls 93. The construction is such that when the upper shaft 31 and the disk 43a are rotated in one direction, the balls will jam in the wedge-shaped spaces and impart rotation to the block 85 and the lower shaft 45. When the upper shaft is rotated in the opposite direction, the balls will shift to the wider ends of the wedge-shaped spaces and will not be effective in imparting rotation to the block and the lower shaft. This clutch will permit the supplemental shaft to be turned by the key when it is desired to wind the main spring without imparting rotation to the lower shaft and the pinion, and therefore without imparting rotative movement to the camera.

After the attachment has been applied to the camera and the base, on pressing the usual film feed control button of the camera, the spring 5 will become effective to rotate the film reels and feed the film, and at the same time said spring will rotate the supplemental shaft and through the bevel gears rotate the upper and lower shafts and cause the pinion at the lower end of the lower shaft to roll around the fixed large gear. This will cause the plate 49 and the camera connected to the plate to receive rotative movement. When the camera is moved through an arc of the desired extent, the control button may be pressed to arrest the rotative movement of the camera.

In some instances it may be desirable that the rotative movement of the camera shall be automatically arrested. To accomplish this, a clamp 95 (Fig. 2) may be secured by a set screw 97 to the periphery of the fixed gear at the desired point. This clamp has a wedge-shaped cam finger 99 which projects in a direction such that in the course of the travel of the pinion along the large gear, the upper face of the pinion will engage the finger, and as it wipes along the same it will pull the lower and upper shafts downward and draw the small pinion 77 out of meshing engagement with the large gear 67, thereby automatically interrupting the transmission and arresting the rotative movement of the camera.

Frequently it is desirable that the panoramic pictures shall have a central feature and include equal ranges at opposite sides of the central feature. To facilitate the accomplishment of this, the large gear has scales 109 and 111 marked thereon, each with graduations numbered from zero to five, and each of said scales extends through an arc of 180°. The construction is such that the operator, after releasing the set screw 76, can turn the camera and the gear 67 until the two zero graduations will be in line with the central feature or object of the panoramic picture to be taken. Then the set screw 76 may be tightened to hold the gear in fixed position. The camera may be turned until, for example, it is in line with one of the graduations numbered "2" as one limit of the picture to be taken. On pressing the control button of the camera, it will automatically be given a rotative movement and may be arrested when it is in line with the other graduation numbered "2", and the feature desired to be located at the center of the panoramic picture will be so located.

It is important that the bottom of the camera shall be parallel with the horizon or sky line in taking panoramic pictures, since otherwise the pictures will be oblique instead of perpendicular to the length of the film. It is not always easy to set the tripod so that the camera will have the proper position. To facilitate levelling of the camera, a spirit or mercurial level 113 may be provided for the attachment, in the present instance, said level being of disk form and mounted in a hole in the large spur gear. When the bubble of the level is at the center thereof, it shows that the bottom of the camera is parallel with the horizon.

It will be understood that the invention is not limited to the specific embodiment shown, and that various deviations may be made therefrom without departing from the spirit and scope of the appended claims.

What is claimed is:

1. The combination of a motion picture camera having a film reel rotating main shaft and a spring for driving the same, said shaft having a socket adapted to receive a key for rotating the shaft to wind the spring; and means for automatically imparting rotative movement to the camera including a supplemental shaft in said main shaft, said supplemental shaft having a socket for receiving the key and adapted to operate through the main shaft in winding the spring.

2. The combination of a motion picture camera having a film reel rotating main shaft and a spring for driving the same, said shaft having a socket adapted to receive a key for winding the spring; a supplemental shaft adapted for insertion into said socket and having a socket for receiving the key, that the latter may operate through the supplemental shaft and main shaft in winding the spring; and means driven by the main shaft and supplemental shaft for imparting rotative movement to the camera in taking panoramic motion pictures.

3. The combination of a motion picture camera having a film reel rotating main shaft and a spring for driving the same, said shaft having a socket adapted to receive a key for winding the spring; a supplemental shaft adapted for insertion into said socket and having a socket for receiving the key, that the latter may operate through the supplemental shaft and main shaft in winding the spring; and a gear mechanism driven by the supplemental shaft for imparting rotative movement to the camera in taking panoramic motion pictures.

4. The combination of a motion picture camera having a film reel rotating main shaft and a spring for driving the same, said shaft having a socket adapted to receive a key for winding the spring; a supplemental shaft adapted for insertion into said socket and having a socket for receiving the key, that the latter may operate through the supplemental shaft and main shaft in winding the spring; a fixed gear, a pinion meshing with said gear, and a transmission between the supplemental shaft and the pinion for causing the latter to roll along the periphery of the gear and impart rotative movement to the camera.

5. The combination of a motion picture camera having a film reel rotating shaft and a spring for rotating the same, said shaft having a socket adapted to receive a key for winding the spring; a supplemental shaft in the socket having a socket for receiving the key that the latter may operate through the supplemental shaft in winding the spring, a support for the camera, a holder secured to the camera and swivelled on the support, a gear fixed on the support, a pinion carried by said holder and meshing with said gear, and means including a clutch for imparting rotation from the supplemental shaft to the pinion for imparting rotative movement to the camera, said clutch having provision permitting rotation of the supplemental shaft by the key in winding the spring without imparting rotative movement to the camera while the latter is on the support.

6. The combination of a motion picture camera having a film reel rotating shaft and a spring for driving the same, said shaft having a socket adapted to receive a key for winding the shaft; a supplemental shaft in said socket and having a socket for receiving the key that the latter may operate through the supplemental shaft in winding the spring; and means driven by the reel rotating and supplemental shafts for imparting rotative movement to the camera on rotation of said shafts in one direction by the spring, said means having provision permitting the key to rotate the shafts in the opposite direction to wind the springs without imparting rotative movement to the camera.

7. The combination of a motion picture camera having a film reel rotating shaft and a spring for driving the same, said shaft having a socket adapted to receive a key for winding the spring; a supplemental shaft projecting into said socket and having a socket for receiving the key that the latter may operate through the supplemental shaft in winding the spring, a bevel gear on the supplemental shaft, a hanger on the supplemental shaft having a bearing, a shaft in said bearing having a bevel gear meshing with the supplemental shaft bevel gear, a plate secured to the bottom of the camera having a bearing, a shaft in the plate bearing, a clutch for imparting rotation from the hanger bearing shaft to the plate bearing shaft, a pinion on the latter shaft, and a fixed gear meshing with said pinion.

8. The combination of a motion picture camera having a film reel rotating shaft and a spring for driving the same, said shaft having a socket adapted to receive a key for winding the spring; a supplemental shaft projecting into the socket and having a socket for receiving the key that the latter may operate through the supplemental shaft in winding the spring, a hanger on the supplemental shaft having a bearing, a shaft in said bearing, intermeshing bevel gears, one on the supplemental shaft and the other on the bearing shaft, a plate, a bearing on the plate, a shaft mounted in the plate bearing, a clutch for driving the plate bearing shaft from the hanger shaft, said plate having a pair of lugs projecting up therefrom for engagement with the bottom edge of the camera, and a flange provided with a set screw for engagement with an opposite bottom edge of the camera, said hanger bearing shaft being splined to the bevel gear thereon, that the plate may be pulled down beneath the camera to allow the supplemental shaft to be inserted properly into the reel driving shaft and then allow the plate to be moved upward so that the plate lugs may be brought by the set screw into secure engagement with the bottom edge of the camera.

9. The combination of a tripod having a head with a threaded stud adapted to be screwed into the bottom of a motion picture camera, a base having a threaded socket adapted to be screwed onto said stud, said base having a socket therein, a gear having a stud in said socket and said gear having a socket, a plate having a stud swivelled in the gear socket, a motion picture camera mounted on the plate and having a film reel rotating shaft and a spring for driving the same, said shaft having a socket therein adapted to receive a key for winding the spring, a supplemental shaft projecting into the reel rotating shaft and having a socket adapted to receive the key that the latter may operate through the supplemental shaft in winding the spring, a bevel gear on the supplemental shaft, a hanger carried by the supplemental shaft and having a bearing, a shaft journalled in said bearing, a bevel gear on the bearing shaft driven by the bevel gear on the supplemental shaft, a bearing on the plate, a shaft in the plate bearing having a pinion meshing with the gear, and a clutch for imparting rotation from the hanger bearing shaft to the plate bearing shaft.

10. The combination of a motion picture camera having a film reel rotating shaft and a spring for driving said shaft; and an attachment for the camera including a transmission driven by said shaft for automatically imparting rotative movement to the whole camera in taking panoramic motion pictures, and means actuated by said rotative movement for automatically interrupting the transmission to arrest the rotative movement of the camera.

ARTHUR C. HAYDEN.